No. 781,987. PATENTED FEB. 7, 1905.
L. A. ASPINWALL.
POTATO DIGGER.
APPLICATION FILED APR. 28, 1904.

Witnesses:
J. Staib
Chas. H. Smith

Inventor.
Lewis A. Aspinwall
per Harold Serrell  atty.

No. 781,987. PATENTED FEB. 7, 1905.
L. A. ASPINWALL.
POTATO DIGGER.
APPLICATION FILED APR. 28, 1904.

Witnesses:
J. Staib
Chas. H. Smith

Inventor:
Lewis A. Aspinwall
per Harold Serrell atty.

No. 781,987. PATENTED FEB. 7, 1905.
L. A. ASPINWALL.
POTATO DIGGER.
APPLICATION FILED APR. 28, 1904.

Patented February 7, 1905.

UNITED STATES PATENT OFFICE.

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

POTATO-DIGGER.

SPECIFICATION forming part of Letters Patent No. 781,987, dated February 7, 1905.

Application filed April 28, 1904. Serial No. 205,273.

*To all whom it may concern:*

Be it known that I, LEWIS AUGUSTUS ASPINWALL, a citizen of the United States, residing at Jackson, in the county of Jackson and State of Michigan, have invented an Improvement in Potato-Diggers, of which the following is a specification.

My present invention is an improvement upon the device shown and described in Letters Patent granted to the Aspinwall Manufacturing Company as my assignee under date of September 23, 1902, No. 709,659. Said patent embraces improvements in both the first and second movements, whereas my present invention relates to improvements in devices going to make up the second movement and to additional features of improvements, the devices going to make up the first movement being substantially the same as in the aforesaid patent. In the device of my present invention, as well as in the device of the aforesaid patent, the frames are strongly made and firmly connected and are of such form, together with the bearings, that all the parts are carried by and swing upon the main axle, and the moving parts are to a large extent covered and protected from contact with earth and vines that may act to clog the same or impede their movements. In my present improvement the second movement includes a series of circularly-arranged arms moving in an inclined plane and in conjunction with an inclined series of bars upon which the first movement delivers the potatoes, vines, and earth from the plow, the said arms and bars being so positioned and operating that a partial to almost complete separation of the earth from the vines and potatoes is accomplished by these parts. I also employ circularly-arranged groups of forks connected with the digger-wheel, toward which the potatoes and vines are moved by the second movement. These groups of forks are connected to pivoted arms, spring-actuated in one direction and positively actuated in the opposite direction by rollers on arms connected therewith and which rollers bear on a cam. These forks perform the function of catching the vines and potatoes as delivered by the devices of the second movement and momentarily holding the same, making a complete separation of the potatoes from the earth. I may also employ a vine and weed carrying device intermediate of the said inclined curved bars and series of forks, which is supported by the plow and the frame of the second movement and which is in gear with and operated by the second movement. The details and particulars of the parts and their movements are hereinafter more particularly specified. This latter device, however, is not required in ordinary clean fields.

$a$ $a'$ represent the wheels of the potato-digger; $b$, the axle; $c$, a sleeve surrounding the axle and upon which there are or may be formed at intervals flanges to which parts of the device are connected for support. Either or both of the wheels $a$ $a'$ are employed for imparting power to drive the mechanism with the movement of the digger, the devices for accomplishing the same being well known in the art and requiring no further description and no illustration. The said sleeve $c$ and any flange $c^2$ or flanges that may be formed therewith and supported by the axle $b$ carry all of the framework, the bearings, and the parts of the different movements, and all of said parts swing upon the axle. A suitable frame connected with said sleeve is provided with a flange $d$, connecting with a flange 5 of the sleeve $f$, and connected to this sleeve $f$ is a casing $g$, there being a bracket 8 from the outer surface of the casing $g$, extending upward to connection with a flange of said sleeve, so that the sleeve $f$ is suitably supported and rigidly connected to the sleeve $c$ at both ends for the initial support of the devices of the second movement. Within this sleeve $f$ is a shaft 17, revoluble for actuating the devices of the second movement. A ratchet 9 and gear 10 are connected and are mounted upon the axle $b$, it being a fact in this art that the wheels are usually loose upon the axle and are provided with one or more pawls at one or both sides of the machine engaging one or more ratchets for the purpose of communicating the power of the wheels to the axle in operating the machine as the machine is drawn over the ground, the wheels directly communicating the power. Upon one end of the said shaft 17 is a pinion 11 and a bevel-gear 12. The pinion 11 meshes with the gear 10 for communicating power from the axle $b$ to the shaft 17, while the gear 12 in turn meshes with a pinion of the first movement, as is common in this art, for effecting the operation of the first movement.

Figure 1:
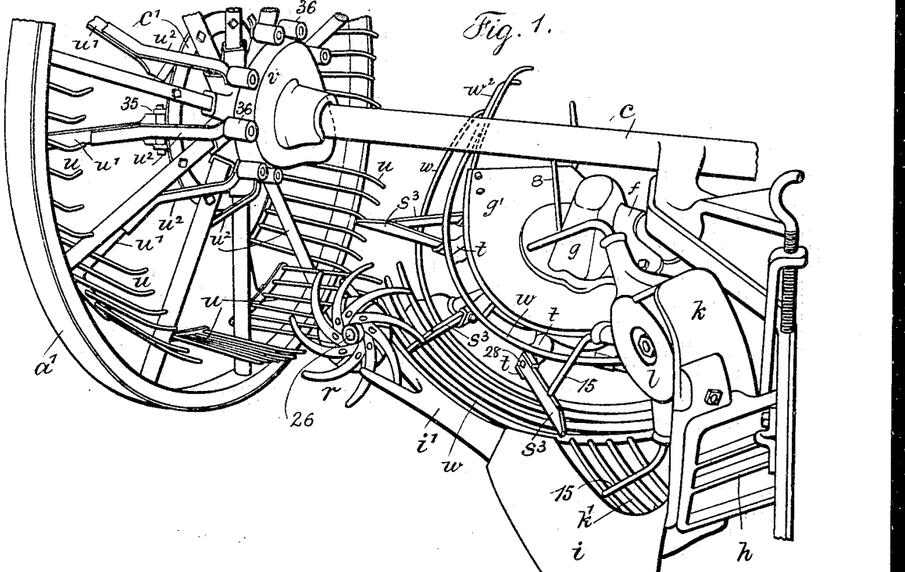
Figure 1 is a perspective view from the front of the potato-digger looking toward the left hand and showing parts of the plow, the first and second movements, the vine and weed carrying device, and the series of forks.
Figure 2:
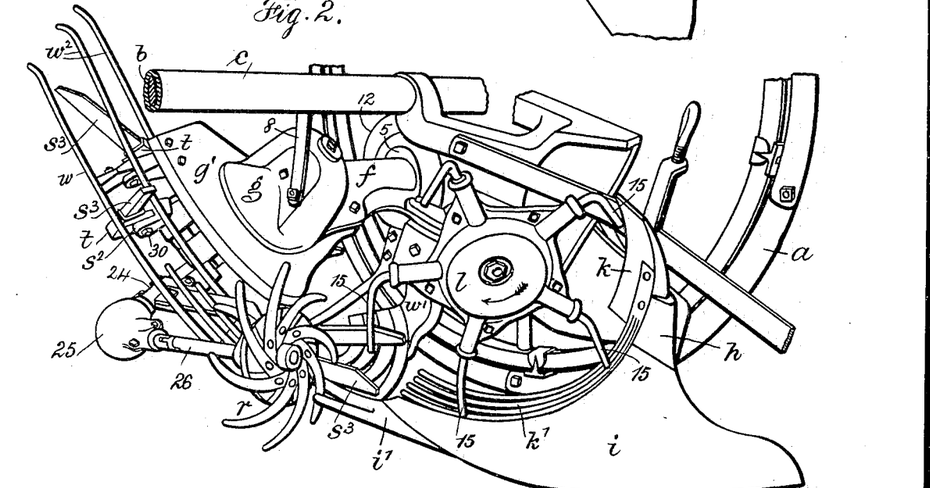
Fig. 2 is also a perspective view from the front of the machine looking toward the right hand, showing parts of the first and second movements, the vine and weed carrying device, and the plow.

With reference to Figs. 1 and 2, $h$ represents a steel bracket at the upper end of the plow $i$, and $k$ a cast bracket connecting the plow and the steel bracket $h$ to parts extending from the sleeve around the shaft of the digger. $k'$ is a grating back of the plow, $l$ a disk, and 15 the pulverizer-arms, the parts $k'$, $l$, and 15 forming the essential operative parts of the first movement and which devices are similar to those shown in the hereinbefore-named patent and which form a part of this art and do not require further description.

Figures 3, 4, 5:
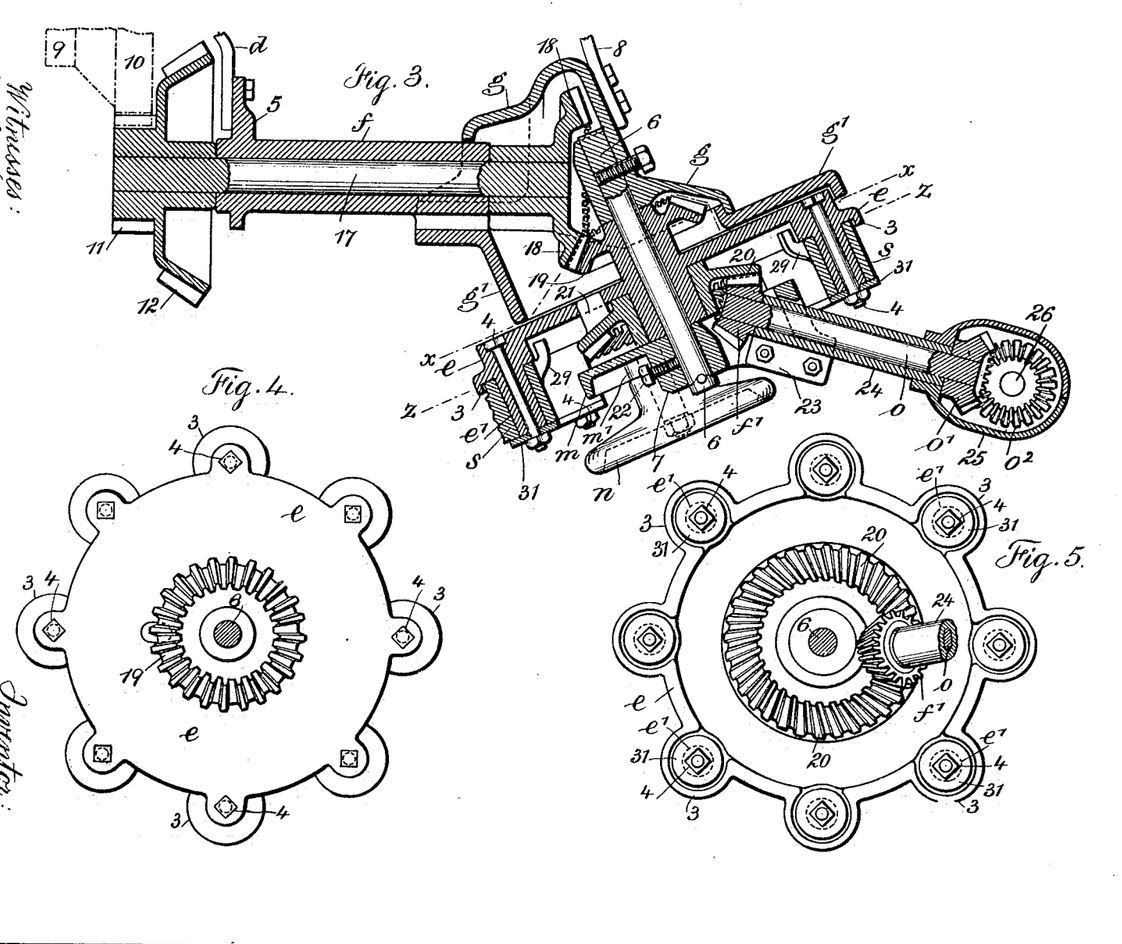
Fig. 3 is a vertical section and partial rear elevation of the essential and inclosed parts of the second movement and the devices for supporting the same from the axle of the machine.
Fig. 4 is a sectional plan at the line *x x* of Fig. 3.
Fig. 5 is an inverted plan and partial section of parts shown in Fig. 3 with certain parts of the second movement removed.

A ring-frame $g'$, Fig. 3, occupies a position below and in part beyond the casing $g$, and the same is preferably connected to the sleeve $f$, with the casing $g$ at the same flanges and by the same bolts, although this is not material. The casing $g$ is made with a sleeve to receive and support an axis 6, which axis is connected to it and is slightly inclined to a vertical line. There are bevel-gears 18 and 19, which mesh with one another and are inclosed by the casing $g$, the bevel-gear 18 being on the end of the shaft 17 opposite to the gear 12, while the bevel-gear 19 extends around the upper portion of the axis 6 below the sleeve of the casing $g$, to which the axis 6 is connected.

$e$ represents a revoluble head having edge flanges 3 and adjacent portions perforated for the bolts 4. This head $e$ is preferably formed integral with the bevel-gear 19 and with a sleeve which surrounds the axis 6, the top surface of the head $e$ being at an inclination to a horizontal plane and at right angles to the axis 6, there being around the lower portion of the sleeve of said head $e$ a bevel-gear 20, formed with a rising lug 21, entering an aperture in said head, by which means the said gear 20 and head are caused to turn, together with the bevel-gear 19, about the axis 6. The teeth of the gear 20 are not placed radially, but are inclined to radial lines to provide for the requisite position of the movement connected thereto. They have a progressive sliding contact.

$m$ represents a cam, with a depending hub 7 placed eccentric to the cam, the said cam and hub being apertured to pass over or receive the axis 6 and said parts being securely held to the said axis in a fixed position by the bolt 22. This cam is provided near its periphery with a depending cam $m'$ and arbor that is offset from the axis 6, and supported by this collar and arbor is a circular cam $n$, with a rounded periphery.

A pinion $f'$ on one end of a shaft $o$ meshes with the gear 20, the same being held up from beneath in contact with said gear by a sleeve 24, which surrounds the shaft $o$, and an arm 23, which is bolted to a depending portion of the flange of the cam *m*. On the other end of the shaft *o* is a bevel-gear *o'*, meshing with a bevel-gear *o²* on a shaft 26, which extends at right angles to the inclined shaft *o* and to the forward portion of the machine, the said bevel-gears being contained in an elbow-casing 25, which is secured to the sleeve 24. On the outer end of the shaft 26 is a disk and a series of curved diverging arms forming a vine and weed carrier *r*. A frame *i'* is connected to and extends out from the plow toward the vine and weed carrier *r*, and the branch *i³* thereof is connected to a bearing-disk *i²*, which disk and frame, together with the sleeve 24 and arm 23, constitute the points of attachment and bearing for this vine and weed feeder and the devices for operating the same, it being a fact that the shaft 26 passes through frame *i'* and the disk *i²* and that a part of the frame *i'* also extends in front of the said vine and weed carrier *r*.

The revoluble head *e*, Figs. 3 to 9, inclusive, is made with the series of bearing-sleeves *e'* around the bolts 4. These sleeves carry the hubs *s*, the upper ends of said hubs *s* coming against the under surface of the head *e* and the lower ends of said hubs coming against washers 31, held by the bolts 4 against the under portion or end of the sleeves *e'*. Each of the hubs *s* is provided with an arm *s'*, on which is mounted a roller 27, the arm *s'* projecting from one side of the hub. From the other side of the hub there projects an arm *s²*. The arm *s'* projects from the lower portion of the hub *s*, while the arm *s²* projects from the upper portion of the hub, and there is a lug 29 which projects from the upper portion of the hub over but at right angles to the position occupied by the arm *s'*, its upper end rising above the under surface of the revoluble head *e* and coming within the under hollow portion of the head, (see Fig. 3,) so that in certain positions of the second movement parts this lug bears against the inner surface of the head to hold the arm that is connected to the arm *s²*. The center of the arm *s²* is tangentially disposed to the hub *s*, (see Fig. 6,) and a part of this arm *s²* is hollow, the recesses being from the under side. (See Fig. 7.)

A wooden arm *s³* is secured by a bolt 28 to a socket-head *t*, connected by a pivot 30 to a depending portion of the arm *s²*, the socket-head *t* having a finger *t'* rising therefrom and entering the hollow portion of the arm *s²*. By reference to Fig. 7, with the arm *s³* in a horizontal position, it will be noticed that the right-hand edge of the finger *t'* bears against the outer portion or wall of the arm *s²*, which wall exists by virtue of the hollow portion of said arm, while in Figs. 8 and 9, where the arm *s³* is raised or in an elevated position by the action of the cam *n*, it will be noticed that the finger *t* comes into close proximity to the wall at the other end of the recess.

The series of wooden arms *s³*, the arms *s²* and *s'*, the hubs *s*, and the rollers 27 are capable of a swinging movement upon the bearing-sleeves *e'*. This movement is imparted by the stationary eccentric cam *m* and the fixed circular cam *m'*, connected to and supported thereby from the axis 6 during the revolution of the revoluble head *e* about this axis 6, said head being revolved by the gears 18 19, the shaft 17, and the pinion and gear connected therewith. From the partial plan view, Fig. 6, the direction of rotation will be noted, and it will be observed that six of the rollers 27 are in contact with the surface of the eccentric cam *m*. The parts are therefore positively held and with four of these parts the arms *s³* are free, while with two of these parts the arms *s³*, by virtue of the action of the circular cam *n*, are in a raised or inclined position.

By reference to Figs. 1 and 2 it will be noticed that the arms *s³* move over the surface of a series of inclined curved bars *w*, ends of which are secured to a frame-support *w'* from the main frame of the first and second movements. These bars and other bars, *w²*, above the arms *s³* extend upward and slightly rearward from their supports, and the upper ends of some of these bars terminate adjacent to the sleeve *c* of the axle. In the operation of the second movement, or separator for the earth from the potatoes, vines, and weeds, these arms *s³* move over the surfaces of the series of inclined curved bars *w* and rest upon the same. I prefer to and do make these arms *s³* of wood, because while strong enough for the performance of their function they are lighter and there is less weight to be moved and less friction between the under surfaces of said bars and the upper surfaces of the bars *w*, which is an important factor in the operation of the machine. In the movement of the arms *s³* and the parts associated therewith the cam *n* raises the arms so that they clear the ground, and said cam, together with the cam *m*, so controls the movements of said arms that they are brought over and guided to the upper surfaces of the bars *w*, where they engage the earth and potatoes, with the vines and the weeds, as they are delivered by the devices hereinbefore described and constituting the pulverizer or first movement. The function of these arms *s³* is then to move the earth, potatoes, and tops along and upward over the surfaces of the bars *w*, gradually forcing the earth between the bars and freeing the potatoes from the same. This movement, therefore, is a drag, so to speak, upon the arms, which causes the lugs 29 to bear with force against the inner surface of the revoluble head *e* to hold the arms in position. The cam *m*, acting upon the rollers 27, also performs the function of holding the parts while the socket-heads *t* bear upon and slide over the surface of the cam *n* (see Fig. 8) for the purpose of elevating the arms *s³* preparatory to guiding the same upon the surfaces of the bars $w$. The two long bars $w$ of the grating extending back of the sleeve $c$ serve to clear from the arms $s^3$ any vines and weeds which are likely to be carried by the said wooden arms.

Figures 6, 7, 8, 10, 11, 12:
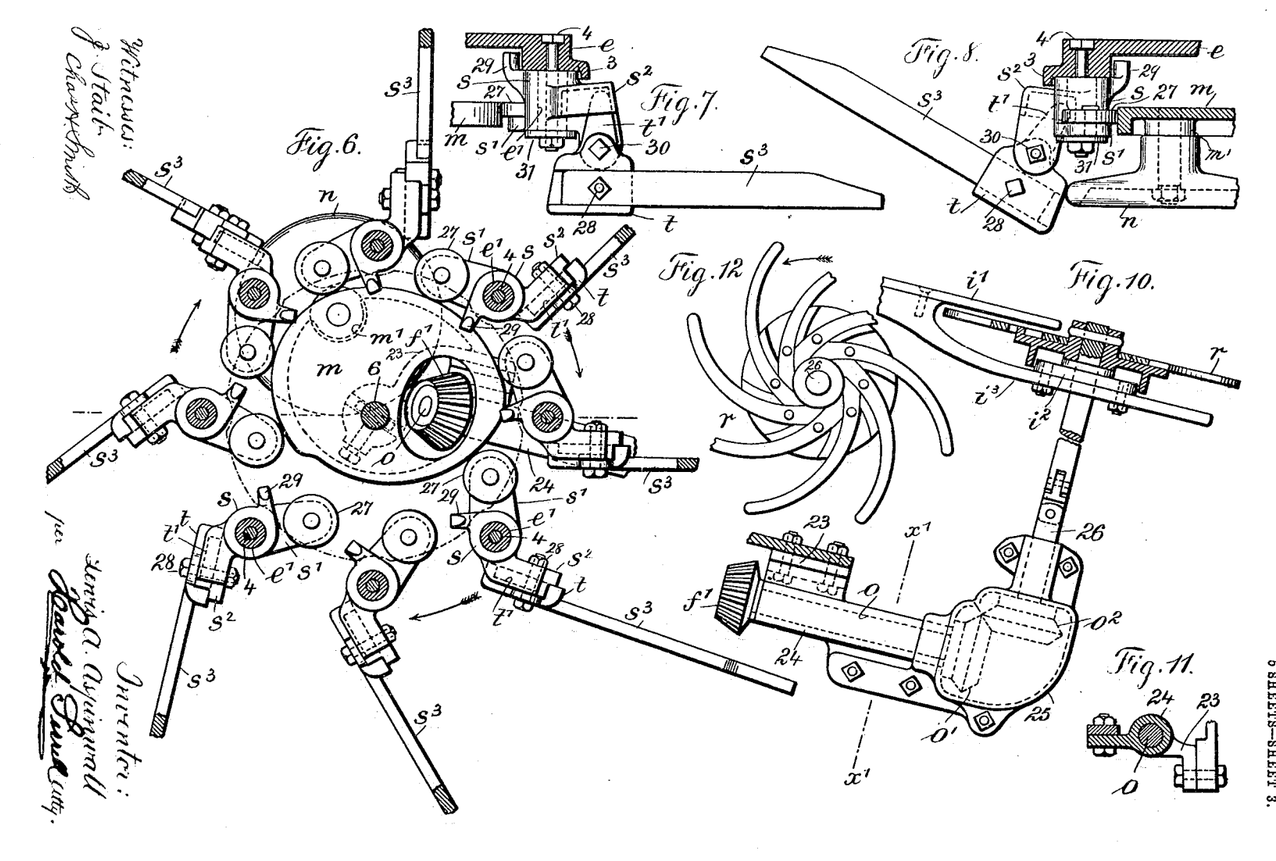
Fig. 6 is a sectional plan at the dotted line *z z* of Fig. 3, showing not only the parts of the second movement in Fig. 3, but also the wooden arms and the supports and rollers therefor connected with the parts shown in Fig. 3.
Fig. 7 is a side elevation and partial vertical section of the arms of the second movement, their moving parts and supports, the arms being in a horizontal position.
Fig. 8 is a view of the arms of the second movement, their moving parts and supports, and the cam for raising the same into an inclined position.
Fig. 10 is a plan and partial section of the vine and weed carrying device and the supports thereof which extend, respectively, to the supports of the second movement and to the plow.
Fig. 11 is a cross-section and partial elevation at the line $x'$ $x'$ of Fig. 10.
Fig. 12 is an elevation, with parts broken away, of the vine and weed carrying device.
Figures 9, 13, 14, 15, 16, 17:
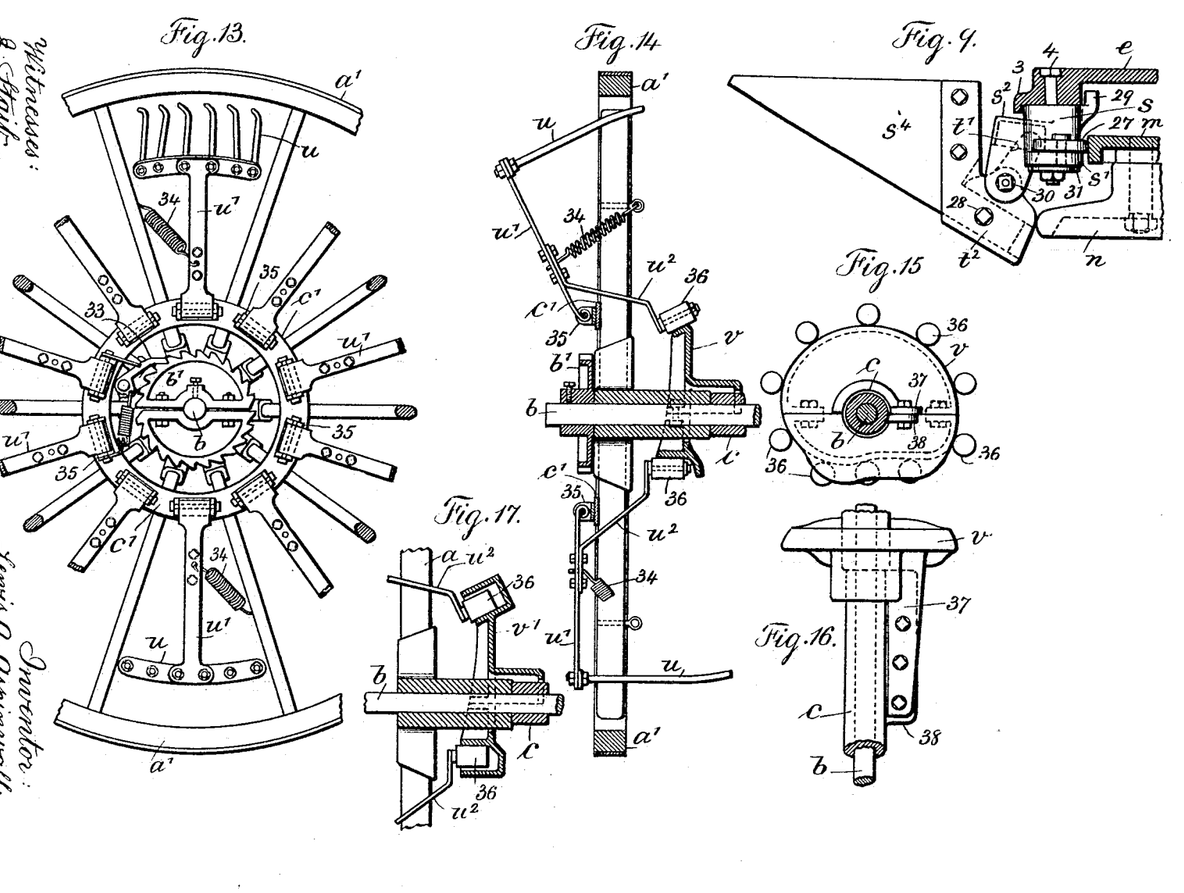
Fig. 9 is a view similar to Fig. 8 and of the same parts, except showing a modified form of the said arms.
Fig. 13 is an elevation of the essential parts of the wheel carrying the series of forks from the outside of the wheel.
Fig. 14 is a cross-section through the wheel and parts shown in Fig. 13.
Fig. 15 is a cross-section through the shaft and the sleeve and an elevation of the cam and devices associated therewith for operating the series of forks, Figs. 13 and 14.
Fig. 16 is a plan and partial section of the shaft, sleeve, and cam of Fig. 15.
Fig. 17 is a vertical section and partial elevation showing a form of my invention with reference to the construction of the cam, Figs. 14, 15, and 16, for actuating the series of forks without springs.
Figure 18:
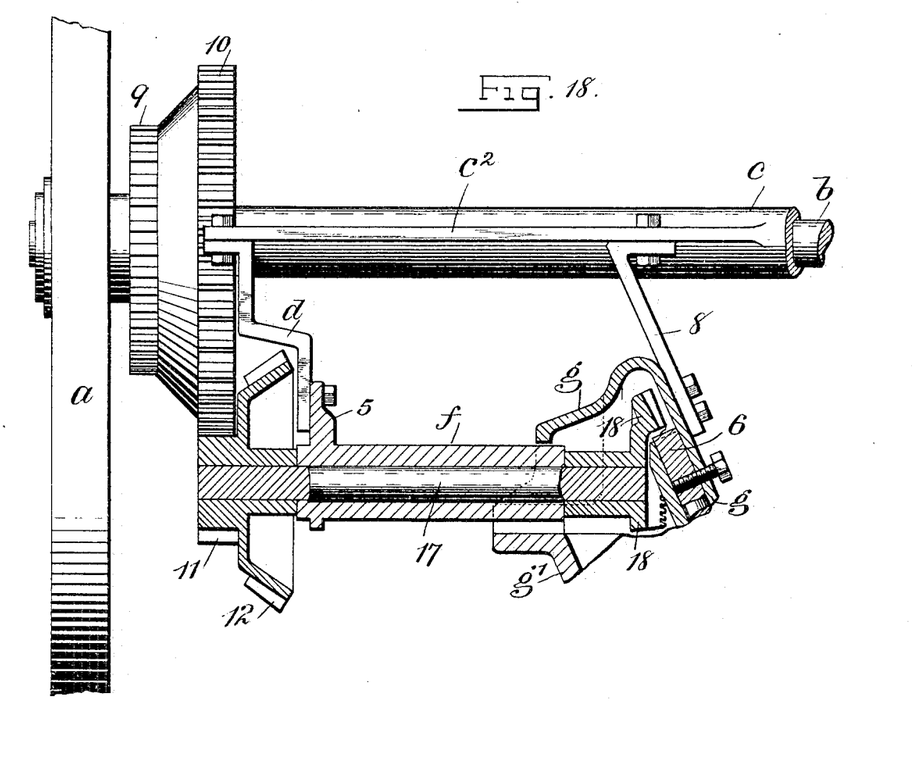
Fig. 18 is an elevation and partial cross-section showing the support from the axle and sleeve of the devices of the second movement.

Fig. 9 is different from Fig. 8 only in showing a different construction of the socket-head $t$ and the arm $s^3$. In this figure the socket-head $t^2$ is shown with a rising portion and the arm is replaced by a triangular blade $s^4$, that fits into the socket-head and is bolted thereto and to the vertical or rising portion thereof. To account for this difference, it may be sufficient to remark that in certain soils the arm $s^3$ is used and in other soils the triangular blade $s^4$ is preferable; but I do not limit myself to either structure.

The third movement of my present improved potato-digger, or the device to more thoroughly separate the vines from the potatoes, comprises the following parts, (see Figs. 13 to 17, inclusive:) Upon the axle $b$ is a ratchet-wheel $b'$, and connected to the wheel $a'$ is a spring-controlled pawl 33. A plate-ring $c'$, appreciably larger in diameter than the ratchet $b'$, is secured to the spokes of the wheel $a'$ upon the outer surface, and this plate-ring $c'$ forms a foundation or support for the circularly-arranged groups of forks that are connected to this wheel of the digger and toward which the potatoes and vines are moved by the separator devices of the second movement. A number of forks $u$, forming a group, are secured at one end to a head-bar and this to an arm $u'$. The arm $u'$ is connected to the plate-ring $c'$ at a suitable pivot-frame 35, and a spring 34, at one end connected to the arm $u'$ and at the other end to a spoke of the wheel, controls and limits the normal position of the group of forks $u$. Between each two of the spokes of the wheel $a'$ is placed one of these groups of forks. Therefore there are series of these groups circumferentially arranged in the wheel, all of the arms $u'$ being located radially. Each arm $u'$ is provided with an arm $u^2$, which extends through between the spokes and is provided at its free end with a roller 36. A cam $v$, preferably of divided parts, is secured to the sleeve $c$ of the axle in such a position that all of the rollers 36 of the arms $u^2$ bear upon the surface of this cam and roll thereon with the movement of the wheel. The parts of the cam are preferably provided with flanges 37 and 38, by means of which the cam is secured to the sleeve $c$ in such a position that the operation of the cam may extend over the hub of the wheel $a'$. (See Figs. 14 and 17.) From Fig. 14, as well as from the perspective view Fig. 1, it will be noticed that the series of forks $u$ nearest the ground are in a substantially horizontal position, while those at the highest point of the wheel are forced outward, so that the points of the forks are in proximity to the rim of the wheel, as between these parts there is a gradual movement by the action of the cam $v$ of the series of forks and a somewhat sudden movement thereof by the peculiar shape of the cam performing the function, after the delivery of the potatoes and the vines thereon by the devices of the second movement, to draw the forks from beneath the potatoes and vines and drop them upon the ground.

In Fig. 17 I have shown as a modification of the cam $v$, Fig. 14, a covered cam $v'$—that is to say, a cam with a flange coming outside of the rollers 36 and in which is a channel in which the rollers run and by which dirt and fine tops are kept away from the operative surface of the cam and which also makes it possible to dispense with the springs 34.

In the devices of my improvement there are four movements. The devices of the first movement, or pulverizer, substantially comprise the grating $k'$, the disk $l$, and the arms 15 and, as hereinbefore stated, are substantially the same as shown and described in my Patent No. 709,659. The devices of the second movement, or separator for the earth from the potatoes, vines, and weeds, comprise the parts particularly shown in Figs. 3 to 9, inclusive, among which are the revoluble head $e$, the series of arms $s^3$, the parts connecting the same, the cams $m$ and $n$, and the series of inclined curved bars $w$, by means of which the earth is separated from the potatoes and the potatoes and vines or tops advanced toward the wheel $a'$. The devices of the third movement, or separator for the vines and potatoes, comprise the series of groups of forks $u$, the spring-controlled pivoted supports therefor, and the cam and rolls for actuating the same, with the special object of making a final and complete separation of the potatoes from the earth, also to deliver the vines more thoroughly to one side. The devices of the fourth movement, or the carrying device for the vines and weeds, and which is interposed, as it were, between the devices of the second movement and the third movement, essentially comprise the shaft $o$, the gears $o'\ o^2$, the shaft 26, and the revoluble vine and weed carrier device $r$, and it is to be understood that while I prefer to use this vine and weed carrier in very weedy ground I do not limit myself to the same, as the entire structure may readily be removed from the machine after its use is not desired. To accomplish this, the arm 23 is unbolted from the depending portion of the cam $m$ and the frame $i'$ separated from the plow $i$, these separations permitting the entire structure between the same to be bodily removed from the machine.

While I have shown and described the series of pivotally-mounted forks and devices constituting the third movement as connected to and supported by the wheel of the potato-digger and while I prefer to so make the parts, I do not herein limit myself in this respect.

I claim as my invention—

1. In a potato-digger, the combination with a plow, a grating and a pulverizer device constituting the first movement of the digger, and means for operating the pulverizer device, of a separator device and means for operating the same constituting the second movement of the machine, a series of separator devices for the vines and potatoes mounted upon a revoluble part of the digger and constituting the third movement of the device.

2. In a potato-digger, the combination with a plow, a grating and a pulverizer device constituting the first movement of the digger, and means for operating the pulverizer device, of a separator device, means for operating the same constituting the second movement of the machine, a separator for the vines and potatoes mounted upon a wheel of the digger and constituting the third movement of the device, a carrying device for the vines and weeds constituting a fourth movement and located intermediate of the second and third movements, and means associated with the second movement for operating the same.

3. In a potato-digger, the combination with a plow, a grating, a revoluble pulverizing device constituting a first movement, and means for operating the same, of a revoluble separator device and a series of inclined curved bars associated therewith and together constituting a second movement of the digger.

4. In a potato-digger, the combination with a plow, a grating, a revoluble pulverizing device constituting a first movement and means for operating the same, of an inclined revoluble head, a series of pivotally-mounted arms connected to and supported therefrom, devices for turning said head, and separate cam devices the one for controlling the movements of said arms and the other for controlling the inclination of said arms.

5. In a potato-digger, the combination with a plow, a grating, a revoluble pulverizing device constituting a first movement and means for operating the same, of an inclined head, a shaft about which said head is revoluble and means for revolving said head, a series of arms and supports therefor associated with said head and upon which the same turn, an eccentric cam and rollers associated with the supports of said arms for contacting with the surface of said cam during part of the movement of said head, and a second cam for swinging the supports of said arms and bringing the same into an inclined position.

6. In a potato-digger, the combination with a sleeve, a casing connected to said sleeve, means for supporting the sleeve and the casing from the axle of the potato-digger, of a shaft passing through the sleeve, a gear and pinion on one end of the shaft and means for operating the same from a wheel of the digger, and a bevel-gear on the other end of the shaft and within the casing and an inclined shaft connected to and supported by the casing, of an eccentric cam and means for securing the same upon the lower end of said inclined shaft, a circular cam and means for securing the same to the eccentric cam at one side thereof and below the same, a head and sleeve therefor mounted upon said inclined shaft above the cams and a gear connected therewith for revolving the said head, depending bearing-sleeves at spaced-apart intervals formed with said revoluble head, hubs surrounding said sleeves, a series of wooden arms and means for supporting the same from said hubs, devices connected to said hubs for pivotally mounting said arms upon said hubs and for limiting the movement of the same, and means associated with said arms and hubs for contacting with the respective cams in controlling the movements and positions of said arms.

7. In a potato-digger, the combination with a sleeve, a casing connected to said sleeve, means for supporting the sleeve and the casing from the axle of the potato-digger, a shaft passing through the sleeve, a gear and pinion on one end of the shaft, and means for operating the same from a wheel of the digger, and a bevel-gear on the other end of the shaft and within the casing, of a cam device surrounding and secured to the lower end of the inclined shaft, a revoluble head and a series of arms pivotally connected thereto and forming part of the devices of the second movement, a gear surrounding the sleeve of the revoluble head and between the same and the cam and moving with said head, a sleeve and an arm connected thereto and secured to the frame of said cam, a shaft mounted in said sleeve with gears on the respective ends thereof, one of said gears meshing with the aforesaid gear, a casing connected to said sleeve, a shaft mounted in the other end of said casing having a bevel-gear meshing with the juxtaposed bevel-gear on one end of said shaft, and a revoluble head and series of curved fingers connected therewith and forming a vine and weed carrier.

8. In a potato-digger, the combination with the shaft 17, the inclined shaft 6 and the bevel-gears 18 and 19, their supports and operating devices, of a revoluble head $e$, an integral series of bearing-sleeves $e'$ associated with the bevel-gear 19 and surrounding the inclined shaft 6, a series of bolts 4 passing through said sleeves with washers 31 beneath the sleeves, a series of hubs $s$ surrounding said sleeves $e'$, a series of wooden arms $s^3$, means for pivotally supporting the same from the hubs $s$ and for limiting the movement thereof, means for swinging the arms $s^3$, means associated with the hubs $s$ for turning the same and other means for limiting their movements.

9. In a potato-digger, the combination with the shaft 17, the inclined shaft 6 and the bevel-gears 18 and 19, their supports and operating devices, of a revoluble head $e$, an integral series of bearing-sleeves $e'$ associated with the bevel-gear 19 and surrounding the inclined shaft 6, a series of bolts 4 passing through said sleeves with washers 31 beneath the sleeves, a series of hubs $s$ surrounding said sleeves $e'$, arms $s'$, $s^2$ formed with hubs $s$ and extending therefrom in opposite directions, the arms $s^2$ being recessed in their under surfaces, rollers 27 pivotally mounted on the ends of the arms $s'$, socket-heads $t$ pivotally mounted to the arms $s^2$, wooden arms $s^3$ secured to the heads $t$, fingers $t'$ forming part of the heads $t$ and extending upward therefrom with the ends in the recesses of the arms $s^2$, lugs 29 formed with and rising from the hubs $s$, and means acting against the rollers 27 and the socket-heads $t$ for swinging the hubs and the parts connected therewith upon the sleeves $e'$ and for swinging the socket-heads $t$ to change the inclination of the wooden arms $s^3$.

10. In a potato-digger, the combination with the shaft 17, the inclined shaft 6 and the bevel-gears 18 and 19, their supports and operating devices, of a revoluble head $e$, an integral series of bearing-sleeves $e'$ associated with the bevel-gear 19 and surrounding the inclined shaft 6, a series of bolts 4 passing through said sleeves with washers 31 beneath the sleeves, a series of hubs $s$ surrounding said sleeves $e'$, arms $s'$, $s^2$ formed with the hubs $s$ and extending therefrom in opposite directions, the arms $s^2$ being recessed in their under surfaces, rollers 27 pivotally mounted on the ends of the arms $s'$, socket-heads $t$ pivotally mounted to the arms $s^2$, wooden arms $s^3$ secured to the heads $t$, fingers $t'$ forming part of the heads $t$ and extending upward therefrom with the ends in the recesses of the arms $s^2$, lugs 29 formed with and rising from the hubs $s$, an eccentric cam $m$ secured to the inclined shaft 6 and adapted to act upon the rollers 27 in swinging the parts to which they are secured, a circular cam $n$ connected to the cam $m$ near one edge thereof and adapted to act upon the socket-heads $t$ for guiding the course of the wooden arms $s^3$.

11. In a potato-digger, the combination with a plow and grating and a revoluble separator device forming the second movement and the supports therefor, and means for operating the same, of a frame $i'$ extending out from the plow, a sleeve 24 and support therefor from the devices of the second movement or separator, a vine and weed feeder device $r$ associated with the devices of the second movement or separator, a shaft 26 for said vine and weed feeder, a shaft $o$ and bevel-gears connecting the shaft $o$ with the shaft 26, supports for said shafts, a pinion $f'$ on one end of the shaft $o$ and a gear 20 connected to and moving with the separator devices of the second movement and having teeth inclined to radial lines, substantially as set forth.

12. In a potato-digger, the combination with a plow, a grating, a pulverizer device forming the first movement, a separator device forming the second movement and one wheel of the digger, of a series of pivotally-mounted forks placed between the spokes of the wheel, means for positively moving said series of forks in one direction, and springs for returning the same to an initial position in the opposite direction.

13. In a potato-digger, the combination with a plow, a grating, a pulverizer device forming the first movement, a separator device forming the second movement and one wheel of the digger, of groups of forks in series, heads and arms to which the same are connected, means for pivotally mounting said arms to the said wheel so that the groups of forks come between the spokes of the wheel, means for holding the said arms and the groups of forks in an initial position, arms secured to the aforesaid arms and rollers on the free ends thereof, and a cam mounted upon the axle of the machine and fixed in its relation to the moving wheel and upon the surface of which the said rollers run for positively moving the groups of forks and the parts connected therewith for their operation.

14. In a potato-digger, the combination with a plow, a grating, a pulverizer device forming the first movement, a separator device forming the second movement and one wheel of the digger, of a plate-ring concentric with the axis of the wheel and secured to the spokes of the wheel, pivot-frames secured to said plate-ring between the radial lines of the spokes, arms pivotally mounted to said pivot-frames having head-bars on their free ends, groups of forks secured to the head-bars and coming between the spokes of the wheel, springs 34 for maintaining the arms and groups of forks in an initial position in which the groups of forks are in planes parallel with the axis of the digger, arms $u^2$ secured to the aforesaid arms, rollers 36 on the free ends of said arms and a cam secured to the sleeve surrounding the axle of the machine and upon the surface of which cam the said rollers 36 run for effecting the movements of the groups of forks.

15. In a potato-digger, the combination with a plow, a grating and the pulverizer device or first movement associated therewith, of an inclined revoluble head, means for supporting and operating the same, a series of pivotally-mounted wooden arms connected to said revoluble head, means for imparting movements to said arms and a series of inclined curved bars $w$ connected to the support of the pulverizer or first movement and coacting with the series of wooden arms whereby the earth and potatoes are delivered by the plow and pulverizer or first movement onto said inclined curved bars to be acted upon by the said wooden bars which move along over the surface of said curved bars, substantially as set forth.

16. In a potato-digger, the combination with a plow, a grating, a pulverizer device forming the first movement, a separator device forming the second movement, and a device revoluble with the movement of the digger, of a series of pivotally-mounted forks secured to and movable with the revoluble device, means for positively moving said series of forks in one direction, and means for returning the same to an initial position in the opposite direction.

17. In a potato-digger, the combination with a plow, a grating, a pulverizer device forming the first movement, a separator device forming the second movement and a circular support device having a hub and revoluble upon the axle of the digger with the movement of the same, of a series of forks secured to and pivotally mounted upon said circular support device and movable therewith, means for positively moving said series of forks in one direction and means for returning the same to an initial position in the opposite direction.

18. In a potato-digger, the combination with a plow, a grating, a pulverizer device forming the first movement, a separator device forming the second movement, and a device revoluble with the movement of the digger, of groups of forks in series, heads and arms to which the same are connected, means for pivotally mounting said arms to the said revoluble device so that the groups of forks come at equal spaced-apart intervals, means for holding the said arms and the groups of forks in an initial position, arms secured to the aforesaid arms and rollers on the free ends thereof and a fixed cam mounted upon the sleeve incasing the axle of the machine and fixed in its relation to the revoluble device and upon the surface of which the said rollers run for positively moving the groups of forks and the parts connected therewith for their operation.

19. In a potato-digger, the combination with a plow, a grating, a pulverizer device forming the first movement, a separator device forming the second movement, and a circular support device having a hub and revoluble upon the axle of the digger with the movement of the same, of groups of forks in series, heads and arms to which the same are connected, means for pivotally mounting said arms to the said circular support device so that the groups of forks come at equal spaced-apart intervals around said circular device, means for holding the said arms and the groups of forks in an initial position, arms secured to the aforesaid arms and rollers on the free ends thereof, and a fixed cam mounted upon the sleeve incasing the axle of the machine and fixed in its relation to the said circular support device and upon the surface of which cam the said rollers run for positively moving the groups of forks and the parts connected therewith for their operation.

Signed by me this 7th day of April, 1904.

LEWIS AUGUSTUS ASPINWALL.

Witnesses:
W. C. SHANAFELT,
P. P. MOORE.